US012563252B2

(12) United States Patent
Kipp et al.

(10) Patent No.: US 12,563,252 B2
(45) Date of Patent: Feb. 24, 2026

(54) LOW LATENCY ADAPTIVE BITRATE LINEAR VIDEO DELIVERY SYSTEM

(71) Applicant: Comcast Cable Communications, LLC, Philadelphia, PA (US)

(72) Inventors: Neill Kipp, Centennial, CO (US); Cory Zachman, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 392 days.

(21) Appl. No.: 15/710,889

(22) Filed: Sep. 21, 2017

(65) Prior Publication Data

US 2019/0090005 A1     Mar. 21, 2019

(51) Int. Cl.
  *H04N 21/2662* (2011.01)
  *H04L 47/25* (2022.01)
  (Continued)

(52) U.S. Cl.
  CPC ......... *H04N 21/2662* (2013.01); *H04L 47/25* (2013.01); *H04L 47/263* (2013.01);
  (Continued)

(58) Field of Classification Search
  CPC ......... H04N 21/2662; H04N 21/64769; H04N 21/2187; H04N 21/2225; H04N 21/23439;
  (Continued)

(56) References Cited

U.S. PATENT DOCUMENTS 6,944,226 B1 * 9/2005 Lin ........................ H04N 19/40
                                                    375/240.2
7,522,664 B1 * 4/2009 Bhaskar ............. G01N 21/9501
                                                    348/126
(Continued)

FOREIGN PATENT DOCUMENTS

EP        1895737 A1 *  3/2008  ....... H04L 29/06027

OTHER PUBLICATIONS

Yasuaki T0kum0 et al: "DASH: segment availability for low-latency live streaming", 100. MPEG Meeting; Apr. 30, 2012-Apr. 5, 2012; Geneva; (Motion Picture Expert Group or I SO/1 EC JTC1/SC29/WG11),, No. m24795, Apr. 25, 2012 (Apr. 25, 2012), XP030053138.

(Continued)

*Primary Examiner* — Philip J Chea
*Assistant Examiner* — James Ross Hollister
(74) *Attorney, Agent, or Firm* — BakerHostetler

(57) ABSTRACT

A content distributor in a content distribution system may be configured to encode each frame of a content asset individually and separately from a plurality of other frames of the content asset. Each frame of the content asset may be encoded to a plurality of pixel resolutions and may be transmitted using an Internet Protocol (IP) network such that the frame is available for playback by at least one user device. Each frame of the content asset may be placed in one or more buffers where it may be requested by a user device for playback through a content delivery network. The con- (Continued)

```
┌──────────┐     ┌─────────────────────────────────┐          ┌──────────┐
│ Service  │     │ ┌─────────┐                     │          │  User    │
│ Provider │◄───►│►│ Encoder │                     │─────────►│ Device   │
│   102    │     │ │   104   │                     │          │   110    │
└──────────┘     │ └─────────┘                     │          └──────────┘
                 │      ▲                           │
                 │      ▼                           │
                 │ ┌─────────┐                      │
                 │ │ Origin  │                      │
                 │ │ Server  │                      │
                 │ │  106    │                      │
                 │ └─────────┘                      │
                 │      ▲                           │
                 │      ▼                           │
                 │ ┌─────────┐                      │
             ┌───┤ │ Content │                      │
             │   │ │Delivery │◄─────────────────────┘
  100        │   │ │ Network │
             │   │ │  108    │
             │   └─┴─────────┴──────────────────────┘
```

110a    110b    110c    110d    110e    110f tent distributor may be configured to generate a manifest that contains a list of specific network locations (e.g., URL's) for each pixel resolution of the frame.

21 Claims, 7 Drawing Sheets

(51) Int. Cl.

| | |
|---|---|
| H04L 47/263 | (2022.01) |
| H04L 47/36 | (2022.01) |
| H04N 21/2187 | (2011.01) |
| H04N 21/2225 | (2011.01) |
| H04N 21/2343 | (2011.01) |
| H04N 21/2347 | (2011.01) |
| H04N 21/262 | (2011.01) |
| H04N 21/472 | (2011.01) |
| H04N 21/647 | (2011.01) |
| H04N 21/845 | (2011.01) |

(52) U.S. Cl.
CPC ....... *H04L 47/365* (2013.01); *H04N 21/2187* (2013.01); *H04N 21/2225* (2013.01); *H04N 21/23439* (2013.01); *H04N 21/2347* (2013.01); *H04N 21/26258* (2013.01); *H04N 21/64769* (2013.01); *H04N 21/8456* (2013.01); *H04N 21/47202* (2013.01)

(58) Field of Classification Search
CPC ......... H04N 21/2347; H04N 21/26258; H04N 21/8456; H04N 21/47202; H04L 47/25; H04L 47/263; H04L 47/365
USPC ......................................................... 709/233
See application file for complete search history.

(56) References Cited

U.S. PATENT DOCUMENTS

| | | | | |
|---|---|---|---|---|
| 2002/0131639 | A1* | 9/2002 | Prakash | G06T 9/00 382/199 |
| 2002/0169749 | A1* | 11/2002 | Kageyama | H04N 7/17318 |
| 2004/0061773 | A1* | 4/2004 | Liu | H04N 7/147 348/14.02 |
| 2004/0136457 | A1* | 7/2004 | Funnell | H04N 19/40 375/240.01 |
| 2004/0160532 | A1* | 8/2004 | Sun | H04N 5/4448 348/559 |
| 2005/0125838 | A1* | 6/2005 | Wang | H04N 7/17318 725/109 |
| 2005/0210509 | A1* | 9/2005 | Jones | H04N 21/4856 725/46 |
| 2005/0276282 | A1* | 12/2005 | Wells | H04N 21/4341 370/503 |
| 2007/0036229 | A1* | 2/2007 | Gass | H04Q 11/04 375/259 |
| 2007/0143807 | A1* | 6/2007 | Suneya | H04N 21/2187 725/115 |
| 2008/0170619 | A1* | 7/2008 | Landau | H04N 21/812 375/240.16 |
| 2008/0256271 | A1* | 10/2008 | Breed | G06F 12/06 710/52 |
| 2009/0103606 | A1* | 4/2009 | Lu | H03M 7/30 375/240.02 |
| 2010/0118158 | A1* | 5/2010 | Boland | H04N 5/23293 348/211.2 |
| 2012/0005364 | A1* | 1/2012 | Ma | H04L 65/752 709/231 |
| 2012/0093489 | A1* | 4/2012 | Zhang | H04N 5/783 386/343 |
| 2013/0060956 | A1* | 3/2013 | Nagaraj | H04N 21/85406 709/231 |
| 2013/0144979 | A1* | 6/2013 | Kansal | H04N 21/23106 709/219 |
| 2013/0154848 | A1* | 6/2013 | Kim | G08C 19/00 340/870.02 |
| 2013/0239158 | A1* | 9/2013 | Chan | H04N 21/8456 725/109 |
| 2014/0029671 | A1* | 1/2014 | Hattori | H04N 19/436 375/240.16 |
| 2014/0132837 | A1* | 5/2014 | Ye | H04N 21/42692 348/525 |
| 2014/0173430 | A1* | 6/2014 | Clavel | G06F 3/0481 715/716 |
| 2014/0196079 | A1* | 7/2014 | Jannard | H04N 7/1675 725/31 |
| 2014/0226814 | A1* | 8/2014 | Fernando | H04L 9/06 380/200 |
| 2015/0213809 | A1* | 7/2015 | Peters | G10L 19/002 704/500 |
| 2015/0373383 | A1* | 12/2015 | Pichumani | H04N 21/4825 725/90 |
| 2016/0119657 | A1 | 4/2016 | Sun | |
| 2016/0173875 | A1* | 6/2016 | Zhang | H04N 19/436 375/240.03 |
| 2016/0360282 | A1* | 12/2016 | Graham | H04N 21/26613 |
| 2016/0366118 | A1 | 12/2016 | Wang | |
| 2016/0366408 | A1* | 12/2016 | Edso | H04N 19/115 |
| 2017/0013307 | A1* | 1/2017 | Kim | H04N 21/4325 |
| 2017/0188054 | A1* | 6/2017 | Ma | H04L 67/563 |
| 2017/0264968 | A1 | 9/2017 | Mao et al. | |
| 2018/0014041 | A1* | 1/2018 | Chen | H04L 65/612 |
| 2018/0302624 | A1* | 10/2018 | Gadelrab | H04N 19/176 |

OTHER PUBLICATIONS

Anonymous: "Text of ISO/1EC 23009-1:2014 Dynamic adaptive streaming over HTTP (DASH) Part 1: Media presentation description and segment formats", May 15, 2014 (May 15, 2014), XP055546368, Retrieved from the Internet: URL:https://standards. iso.org/ittf/Publicl yAvailableStandards/c065274 ISO IEC 23009- 1 2014.zip [retrieved on Jan. 23, 2019].

* cited by examiner

Receive content asset

Potential latency introduced:

202  Transcode content asset to multiple pixel profiles — 2.0 seconds

204  Package DASH segments — 2.0 seconds

206  Package content asset into HLS — 50 ms

208  Transport content asset across network — 150 ms

210  Buffer content asset — 4 seconds

Total latency introduced:      8.2 seconds

302

Receive a content asset comprising a
plurality of frames

300

304

Encode a given frame of the plurality of frames

306

Cause transmission of the frame

502

Receive a frame of a plurality of frames associated with a content asset

500

504

Encode the frame independent of the plurality of other frames associated with the content asset

506

Store the frame in a buffer

508

Generate a manifest that identifies the frame as available for playback

602

Receive a manifest indicating that one or more frames associated with a content asset are available for playback

600

604

Send a request for a first frame of the one or more frames

606

Receive the first frame

608

Cause playback of the first frame

LOW LATENCY ADAPTIVE BITRATE LINEAR VIDEO DELIVERY SYSTEM

BACKGROUND

Adaptive bitrate streaming is a method of streaming content to one or more computing devices over a network. A content distribution system utilizing adaptive bitrate streaming may be configured to segment a content asset, such as a movie or television show, into a number of smaller content fragments, each fragment containing a short interval (e.g., two seconds) of playback time of the content asset. The fragments may be made available by the content distributor at a variety of different bit rates. When a computing device requests playback of the content asset from the content distributor, the device may select, from the variety of different bit rates, the next fragment to download and playback based on current network conditions. For example, the device may select the fragment with the highest bit rate that can be downloaded in time for playback without causing stalls or re-buffering events in the playback. As network conditions improve or deteriorate, the device may request a subsequent fragment of the content asset having a higher or lower bit rate reflective of the network conditions.

SUMMARY

Methods and systems for reducing latency in a content distribution system are disclosed herein. A content distributor associated with the content distribution system may receive a content asset, such as a movie asset, a television asset, a live broadcast asset, an audio asset or a Video on Demand (VOD) asset. The content asset may be received at the content distributor as a single content asset comprising a plurality of frames or content segments, or may be received at the content distributor as a plurality of separate frames. In response to receipt of the content asset, the content distributor may be configured encode each frame of the content asset individually and separately from the plurality of other frames of the content asset. In the example that the content asset is received as a single content asset, the content distributor may first be configured to divide the content asset into a plurality of frames prior to encoding each frame of the content asset. Each frame of the content asset may be encoded to a plurality of pixel resolutions and transmitted over a network that comprises an Internet Protocol (IP) network and/or other networks, such that the frame is available for playback by at least one user device. For example, each frame of the content asset may be placed in a buffer where it may be requested by a user device for playback, and delivery over a content delivery network. The content distributor may be configured to generate a manifest that contains a list of specific network locations (e.g., URL's) for each pixel resolution of the frame.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described herein for reducing latency in a content distribution system by encoding each frame of a content asset separately and individually from the plurality of other frames of the content asset. In a content distribution system that utilizes adaptive bit rate streaming, a content asset may be segmented into a number of smaller content fragments, each fragment containing a short interval (e.g., two seconds) of playback time of the content asset. This process may introduce a period of latency (e.g., multiple seconds) between the time of receipt of the content asset by a content distributor associated with the content distribution system and the time the content asset is made available for playback by one or more user devices.

Figure 1:
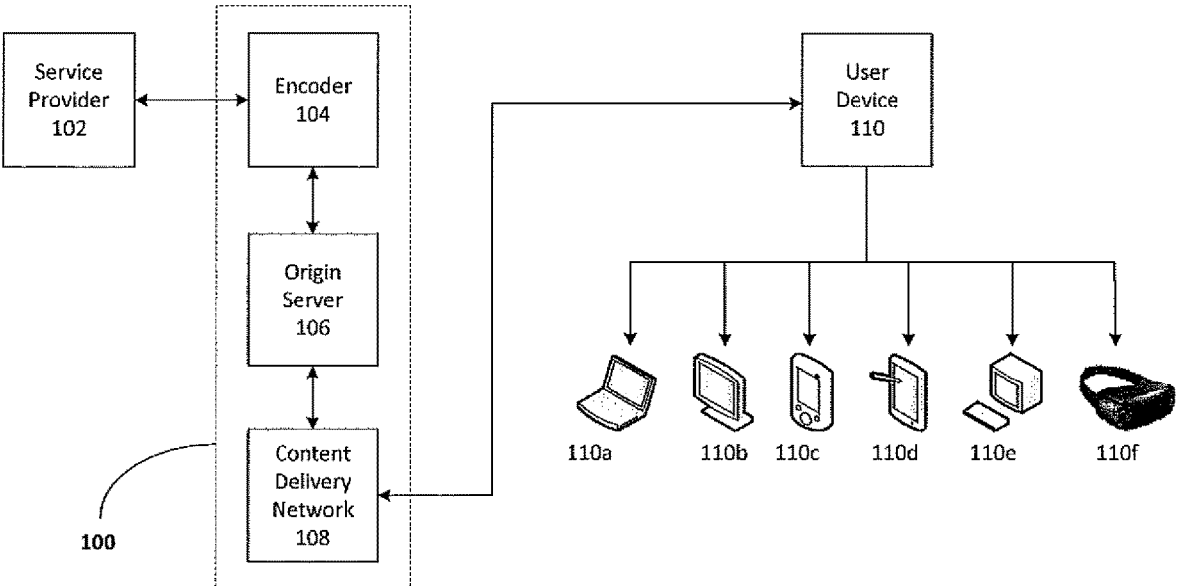
FIG. 1 shows a block diagram of a system in accordance with aspects of the disclosure.

FIG. 1 shows an example content delivery system 100 for reducing latency associated with the delivery of a content asset to a user device. A content distributor 102, such as a service provider (e.g., Internet content distributor, cable television content distributor, etc.), may receive a content asset. The content asset may be received as a single content asset comprising a plurality of frames or content segments, or may be received as a plurality of separate frames or a plurality of separate content segments. In response to receipt of the content asset, the content distributor 102 may encode each frame of the content asset separately and individually from the plurality of other frames of the content asset and may transmit the frame using, for example, an Internet Protocol (IP) network, such that the frame is available for playback by a user device. In the example that the content asset is received as a single content asset or as a plurality of content segments, the content distributor may be configured to divide the content asset into the plurality of frames prior to encoding. By encoding and transmitting each frame of the content asset individually, in contrast to encoding and transmitting a segment of the content asset having a particular duration (e.g., two seconds), latency may be reduced.

The system 100 may comprise an encoder 104. An input of the encoder 104 may receive a content asset from one or more sources, such as the content distributor 102. The content asset may be received in any one of a variety of formats, such as, for example, H.262, H.264, H.265, MPEG-4 Part 2, or MPEG-2, and may be transmitted using one or more standards such as SCTE-35 or other specifications. Although reference may be made to example standards (e.g., MPEG) and formats, one of skill in the art will recognize that the systems and methods described herein are applicable to any format or standard that support audio and/or video. The combined MPEG-1, MPEG-2, and MPEG-4 or other MPEG standards are hereinafter referred to as MPEG.

The output of a single MPEG audio and/or video codec may be referred to herein as a transport stream. In an MPEG encoded transmission, content and other data are transmitted in packets, which collectively make up the transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts may ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel" merely has to decode the payload of the PIDs associated with its program. The receiver may discard the contents of all other PIDs.

In one embodiment, the encoder 104 may receive, from the content distributor 102, an uncompressed content asset having a maximum playback resolution. For example, the content asset may be received at the encoder 104 at a High Definition (HD), Ultra High Definition (UHD), 4K Ultra High Definition (4K) or High Dynamic Range (HDR) playback resolution. The encoder 104 may be configured to encode each frame of the received content asset individually and separately from the plurality of other frames of the content asset. The encoder 104 may encode a given frame of the content asset using Joint Photographic Expert Group (JPEG) compression techniques, such as JPEG 2000 compression. However, it is understood that any other type of compression technique may be used. Each frame of the received content asset may be encoded to a plurality of pixel resolutions (e.g., 1280×720, 1024×578, 640×360, 512×288, etc.) and sent individually and separately to the origin server 106.

The origin server 106 may be configured to receive and fulfill a request from any of the user devices 110, via the content delivery network 108, to deliver one or more frames of the content asset to the device 110 for playback. The request from the device 110 to deliver one or more frames of the content asset may comprise an identification of the user (e.g., an account identifier, a username and/or a password), the device 110, the requested content asset, and/or a playback time point or temporal location. In certain aspects, the request to deliver one or more frames of the content asset may reflect a user skipping to a particular portion of a content asset of which the initial segments of the content asset have already been delivered and played on the device 110.

The origin server 106 may be configured to generate a manifest file associated with the content asset. Generally, the manifest may contain information describing various aspects of the associated content asset that may be useful for the device 110 to playback the content asset and/or for the content distributor 102 to store and retrieve the program. For example, a manifest file may identify each of the plurality of frames of the content asset, the number of frames included in the content asset, and/or the proper ordering of the frames necessary to effectuate playback of the content asset. A manifest file may comprise a network location (e.g., a hyper-text transfer protocol (HTTP) uniform resource locator (URL) link or other universal resource identifier (URI)) for each frame from which the frame may be downloaded, accessed, or retrieved. It will be appreciated that the network locations included within a manifest file may point to more than one different location or source.

The manifest file may be provided to any of the devices 110 in response to a request to receive a program. The device 110 may use the manifest file to determine the frames required to play the program or a portion of the program and may subsequently download the required frames using the network locations specified in the manifest file. Upon receiving a request to deliver a content asset to the device 110, the origin server 106 may provide one or more manifest files to the device 110 via the content delivery network 108 that describe the program and segments thereof, including network locations from which each frame of the content asset may be downloaded. Using the manifest file, the device 110 may iteratively download and begin playback of the content asset.

The content delivery network 108 may be configured to act as an intermediary server located between the user device 110 and the content distributor 102. More particularly, the content delivery network 108 may be configured to serve cached objects to the user device 110 and to manage some or all aspects of the cached objects of the user device 110. Such architecture may reduce the cost, resource, and bandwidth usage and may improve the security of user device 110. For example, instead of validating the cached objects by committing various resources and using bandwidth to connect to a plurality of network-based resources, user device 110 needs only to request the validation from the content delivery network 108. In turn, the content delivery network 108 may connect to the plurality of network-based resources, such as the origin server 106, to refresh the cached objects, and return the refreshed objects to user device 110.

A user device 110 may comprise, for example, at least one of a laptop 110*a*, a television 110*b*, a smartphone 110*c*, a tablet 110*d*, a desktop 110*e*, a VR headset 110*f*, or any other device capable of presenting content to a user. The user device 110 may interact with the content distributor 102 via a user interface associated with the user device 110. Upon this interaction, the content asset or a portion thereof may be delivered to the user device 110 for playback via the content delivery network. It is understood that the term user device 110 as used herein may comprise any combination of a hardware element, such as any of the devices 110a-110f, a set-top cable box, a streaming-video player, or a quadrature amplitude modulation (QAM) client, or a software element, such as a web browser or other software adapted to playback video.

Figure 2:
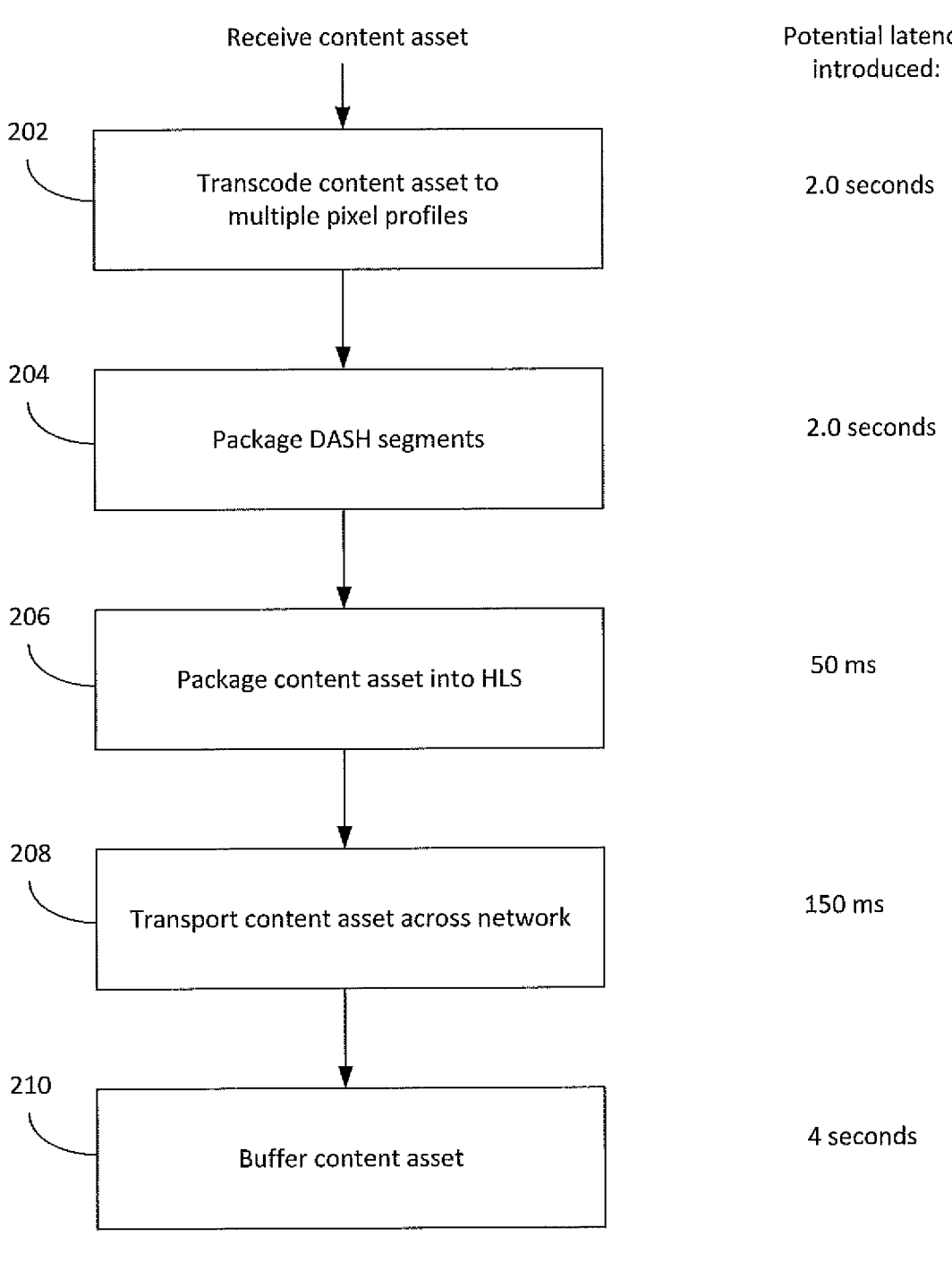
FIG. 2 shows an example content delivery system using adaptive bitrate streaming.

FIG. 2 shows an example implementation of adaptive bitrate streaming technology. Specifically, FIG. 2 shows an example content asset delivery system utilizing MPEG DASH technology. MPEG DASH is an adaptive bitrate streaming technique that enables streaming of content assets over the Internet delivered, for example, from conventional HTTP web servers. Similar to other adaptive bitrate streaming techniques, MPEG DASH works by breaking a content asset into a sequence of small HTTP-based file fragments, each fragment containing a short interval (e.g., two seconds) of playback time of the content asset. Each fragment may be made available at a variety of different bit rates. While the content asset is being played back by a user device utilizing MPEG DASH, the user device may automatically select the next fragment to download and playback based on current network conditions. For example, the user device may select the fragment with the highest bit rate that can be downloaded in time for playback without causing stalls or re-buffering of the content asset. However, MPEG DASH may introduce a significant period of latency between the time of receipt of the content asset by the content distributor and the time the content asset is made available for playback by the user device.

As shown at step 202, the content asset received by the content distributor 102 may be transcoded. Transcoding the content asset may comprise converting the content asset from one video format to another video format, such as one amenable to the means by which the content distributor's users view the content. For example, transcoding the content asset may comprise converting the content asset from a Flash Video (FLV) format to an MPEG-4 video stream. Transcoding the content asset may comprise compressing the content asset using digital audio/video compression, such as MPEG, or any other type of compression. As further shown at step 202, the content asset may be encoded into multiple pixel profiles. The content asset may be encoded to four additional pixel profiles and, along with the pixel profile of the content asset received by the content distributor 102, may be output as plurality of User Data Protocol (UDP) multicast streams, one stream per output pixel resolution. The transcoder may insert time-alignment indicators into each output stream such that the media streams may be aligned and synchronized by the packager. The time-alignment indicators may be inserted approximately every two seconds, or more or less often, such as every one, three, six, or ten seconds. The transcoding/encoding process shown at step 202 may introduce delivery latency in the content distribution system. The latency may be approximately the same as the duration between the time-alignment indicators. Thus, the latency introduced when there is a two-second interval between time-alignment indicators may be approximately two seconds.

At step 204, the content asset may be packaged into a plurality of DASH segments. A packager associated with a transcoder may be configured to receive the plurality of streams output from the transcoder, where each stream may consist of one pixel resolution. The packager may be configured to receive each stream and to assemble each media payload into time-aligned segments of video and audio. In one embodiment, the encoder may be a parallel encoder configured to read each media stream in the simultaneously and to generate media segments in parallel. Further, the packager may be configured to read the time-alignment indicators in the arriving transmission and to save each resulting media package as a DASH segment, for example, on a RAM disk. Packaging the content asset into a plurality of DASH segments may result in additional latency at the content distribution system. For example, a two-second interval between time-alignment indicators may result in a packaging latency of approximately two seconds.

At step 206, the DASH segments may be packaged to an alternative format, such as HTTP live streaming (HLS). DASH segments may need to be packaged into an alternative format as many user devices do not support playback of DASH segments. In one embodiment, an open source web server may be used to package the DASH segments into HLS. HLS is an HTTP-based media streaming communications protocol that, similar to MPEG DASH, works by breaking the overall stream into a sequence of small HTTP-based file downloads, each download comprising a fragment of an overall potentially unbounded transport stream. As the stream is played, the user device may select from a number of different alternate streams containing the same material encoded at a variety of data rates, allowing the streaming session to adapt to the available data rate. Packaging the fragments into HLS may result in an additional 50 milliseconds of latency at the content distribution system.

At step 208, each two-second fragment may be transported across the content delivery network. The content delivery network may act as an intermediary server located between the user device and the content delivery system. More particularly, the content delivery network may serve the stored fragments to the user device and may manage some or all aspects of serving the stored fragments to the user device. Transporting a given content fragment over the content delivery network may result in an additional 150 milliseconds of latency at the content distribution system.

At step 210, the content asset may be buffered. Buffering the content asset may comprise preloading the content asset into a reserved area of memory of the user device (i.e., the buffer). Generally, a certain amount of data associated with the content asset must be stored in the buffer before playback of the content fragment can begin. Having an advance supply of the content asset prevents playback disruption if there are momentary delays in transmission while the content asset is being played back. For example, playback of a first content asset fragment may not begin until the second content asset is received at the buffer. Buffering the content fragment may result in an additional four seconds of latency at the content distribution system.

Thus, using conventional adaptive bitrate streaming methods such as MPEG DASH, significant latency (e.g., 8.2 seconds) may result between the time of receipt of the content asset by the content distributor and the time the content asset is made available for payback by a user device. This may be particularly troublesome, for example, in live broadcast such as the broadcasting of a football game, resulting in a significant delay in bringing the live content to the viewer. However, by encoding each frame of the content asset individually and separately from the remaining frames of the content asset, this latency may be reduced.

Figure 3:
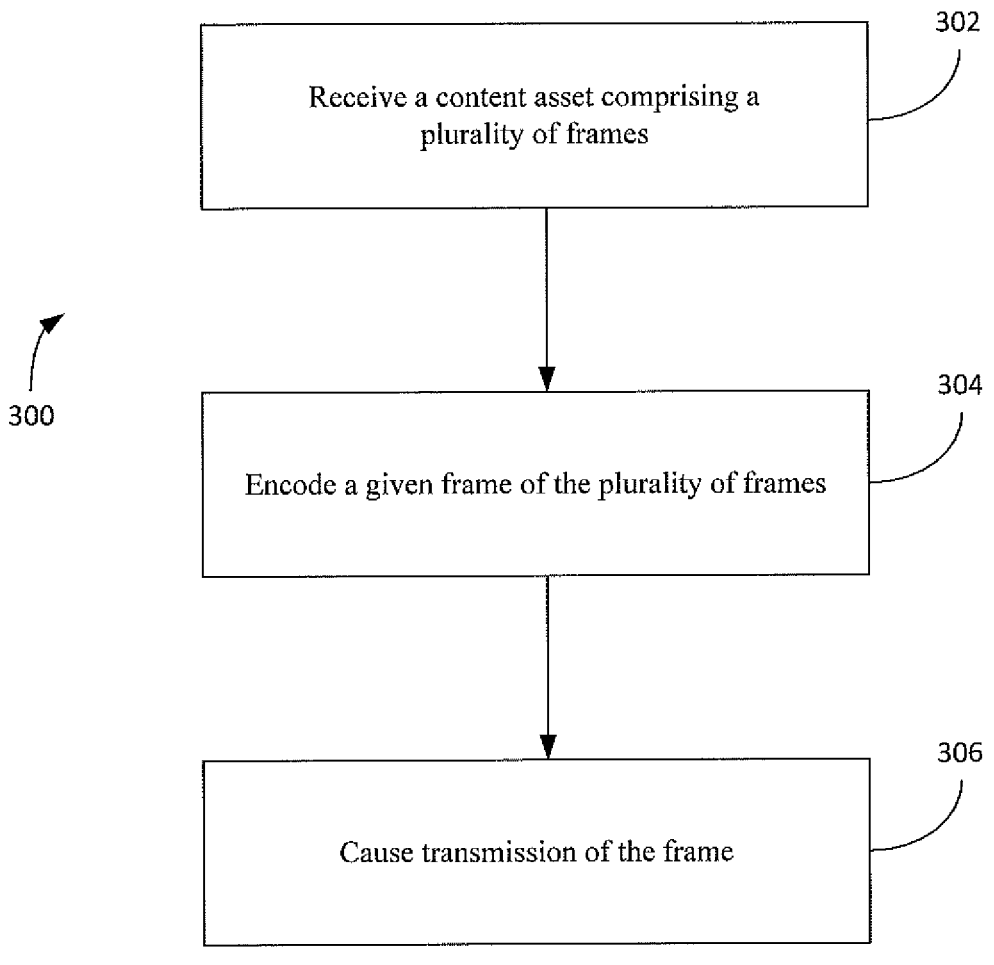
FIG. 3 shows a flow chart of an example method in accordance with an aspect of the disclosure.

FIG. 3 shows a flow chart of an example method 300 in accordance with an aspect of the disclosure. At step 302, a content asset may be received. The content asset may be received as a single content asset comprising a plurality of frames or content segments, or may be received as a plurality of frames or content segments that together form a content asset. The content asset may be received, for example, by the content distributor 102 shown in FIG. 1. The content asset may be any type of video asset, for example, a video clip, a movie asset, a television asset, a live broadcast asset such as a sporting event, an audio asset such as music streaming, or a Video on Demand (VOD) asset. However, it is understood that the content asset may be any type of content asset having any length or duration. The received content asset may comprise a plurality of frames. For example, if the content asset is a two-hour movie having a playback frame rate of 30 frames per second, the content asset may be received as 216,000 individual frames.

At step 304, a given frame of the plurality of frames may be encoded. The frame may be encoded separately from the plurality of other frames of the content asset. The encoder 104 shown in FIG. 1 may receive an uncompressed content asset having a maximum playback resolution and, upon receipt of the uncompressed content asset, may be configured to separately encode each frame of the content asset. For example, the content asset may be received at the encoder 104 at a High Definition (HD), Ultra High Definition (UHD), 4K Ultra High Definition (4K) or High Dynamic Range (HDR) playback resolution. The encoder 104 may be configured to encode each frame of the received content asset individually and separately from the plurality of other frames of the content asset. In the example that the content asset is received as a single content asset or a plurality of content segments, the content asset may be divided into a plurality of frames prior to being encoded. Encoding each frame of the received content asset may comprise encoding the frame to a plurality of pixel resolutions, such as 1280×720, 1024×578, 640×360 and 512×288. The encoder 104 may encode a given frame of the content asset using Joint Photographic Expert Group (JPEG) compression techniques, such as JPEG 2000 compression. However, it is understood that any type of compression techniques may be used.

Encoding a given frame of the plurality of frames of the content asset may comprise encrypting the frame. In one embodiment, each user device configured to receive content from the content distributor may be associated with a public key and a private key pair. While the public key may be known to the content distributor and may be used to encrypt the frame, the private key used to decrypt the received frame may be known only to the user device. Thus, encoding a given frame of the content asset may comprise encrypting the given frame at the content distributor using the public key associated with the user device. The frame may be encrypted individually and separately from the remaining frames of the content asset. The frame may then be transmitted over a secure channel. Upon receipt of the frame by the user device, the frame may be decrypted using only the private key associated with the user device. Thus, any user device that does not know the private key associated with that user device may not be able to decrypt the frame of the content asset. While the embodiment above is described in the context of a public key and private key pair, it is understood that any type of encryption techniques may be used.

At step 306, transmission of the frame may be caused such that the frame is available for playback. The frame may be transmitted using an Internet Protocol (IP) network. An IP network may allow one or more entities, such as the content distributor 102 and the user device 110 illustrated in FIG. 1, to send and receive messages over a network such as the Internet. The content distributor 102 and the user device 110 may each be assigned a unique identifier, such as an IP address, such that each entity may directly address the other for the transmission of data (e.g., a single frame of content) over the network. Although transmission of data is discussed herein using an IP network, it is understood that data may be transmitted using any number of types of networks, including but not limited to Local Area Networks (LANs) Wireless Local Area Networks (WLANs), and Wide Area Networks (WANs). After encoding and transmitting a first frame of the content asset over the IP network, the content delivery system may be configured to encode a second frame of the plurality of frames, the second frame being encoded separately from the plurality of other frames of the content asset, and to cause transmission of the second frame using an IP network such that the second frame is available for playback by the user device.

In one embodiment, a manifest may be generated. The manifest may identify the frame as being available for playback. The manifest may contain information describing various aspects of the associated content asset that may be useful for the device 110 to playback the content asset and/or for the content distributor 102 to store and retrieve the program. For example, the manifest may indicate each of the plurality of frames of the content asset, the number of frames included in the content asset, and/or the proper ordering of the frames necessary to effectuate a playback of the content asset. The manifest may comprise a network location (e.g., a hyper-text transfer protocol (HTTP) uniform resource locater (URL) link or other universal resource identifier (URI)) for each frame from which the frame may be downloaded, accessed, or retrieved.

A content asset may comprise a number of different types of frames. For example, a content asset may comprise one or more of an I-frame, a P-frame and a B-frame. An I-frame (i.e., an intra-coded picture) may be a complete image such as a JPG or BMP image file. In contrast to I-Frames, P and B frames may hold only part of the image information (the part that changes between frames), so they may need less space in the output file than an I-frame. A P-frame (i.e., a predicted picture) may hold only the changes in the image from the previous frame. For example, in a scene where a car moves across a stationary background, only the car's movements need to be encoded. The encoder does not need to store the unchanging background pixels in the P-frame, thus saving space. P-frames are also known as delta-frames. A B-frame (i.e., a bidirectional predicted picture) saves even more space by using differences between the current frame and both the preceding and following frames to specify its content.

The methods disclosed herein of individually compressing frames of a content asset may eliminate the need to use certain types of these frames. In one example, a content asset may comprise only individually encoded I-frames. In this example, a playback device may begin playback of the content asset at any of the encoded frames. In another example, a content asset may comprise individually encoded I-frames as well as individually encoded P-frames. In this example, a playback device may begin playback of the content asset at any one of the encoded I-frames. In yet another example, the content asset may comprise individually encoded I-frames, individually encoded P-frames and individually encoded B-frames, or any combination thereof.

Figure 4:
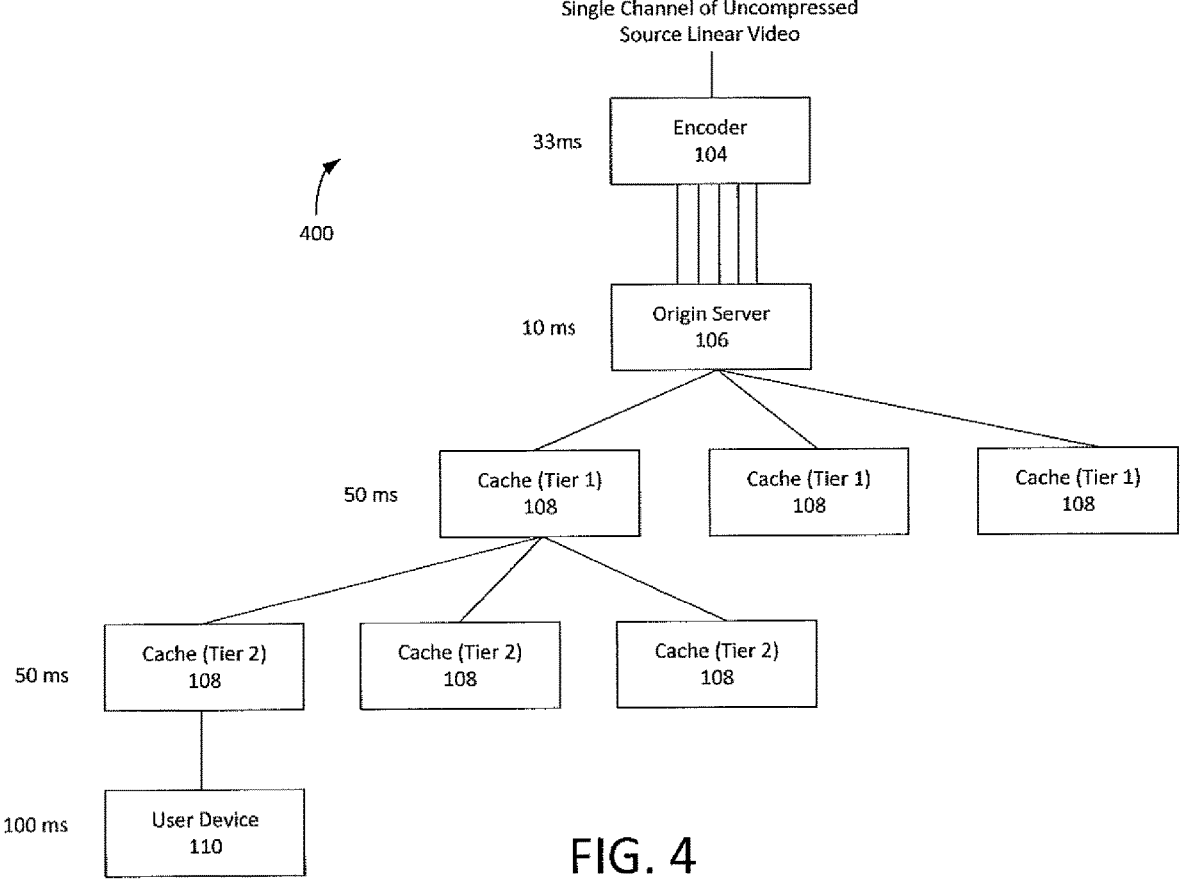
FIG. 4 shows an example architecture for a low latency adaptive bitrate linear video delivery system in accordance with an aspect of the disclosure.

FIG. 4 illustrates an example implementation of a method 400 for separately encoding each frame of a content asset and storing the frames in one or more buffers. As shown in FIG. 4, the content distributor 102 may receive a content asset such as a single channel of uncompressed source linear video. The uncompressed source linear video may be received at a maximum playback resolution, such as a High Definition (HD), Ultra High Definition (UHD), 4K Ultra High Definition (4K) or High Dynamic Range (HDR) playback resolution. An encoder associated with the content distributor 102 may be configured to encode each frame of the content asset individually and separately from the plurality of other frames of the content asset. In one embodiment, the encoder may be a linear encoder configured to encode one or more frames of a content asset in parallel. However, it is understood that any type of encoder may be used. The encoder may be configured to encode, in parallel, the uncompressed source linear video to multiple pixel resolutions such that a multicast stream is generated. The multicast stream may comprise a single frame of the content asset encoded to five different pixel resolutions. Thus, in an example where the linear encoder receives a frame having an 4K UHD pixel resolution (3840×2160), the linear encoder may be configured to encode, in parallel, the frame of the content asset into four additional pixel resolutions (e.g., 1280×720, 1024×578, 640×360 and 512×288). The process of encoding a frame, in parallel, to a plurality of pixel resolutions may result in about 33 milliseconds of latency in the content distribution system.

An origin server, such as the origin server 106 illustrated in FIG. 1, may be configured to receive the multicast stream from the encoder. The origin may be configured to generate or update a manifest and to timestamp each frame of the content asset received from the encoder and to cache them in one or more buffers at the origin. The buffer may be an area of memory used for the temporary storage of data, such as the frames of the content asset. In one embodiment, the buffers may be circular buffers. However, it is understood that any type of buffer may be used. Once stored in a given one of the buffers, the frame may be available for playback by one or more user devices. The buffer, in response to a request for playback of the frame by a user device, may send the frame to at least one cache of a plurality of caches in a content delivery network. Each buffer may be configured to deliver frames to as many user devices as its network bandwidth permits, and may be connected to a branching graph of linear caching proxies in the content delivery network. The process of generating a manifest, timestamping each frame and storing the frames in a circular buffer at the origin may result in about 10 milliseconds of latency in the content distribution system.

Each linear proxy cache in the content delivery network may comprise a circular, timestamped frame buffer of each pixel resolution of video currently being viewed by a playback client, such as the user device 110 illustrated in FIG. 1. In one embodiment, one or more caches in the content delivery network may be a linear proxy cache. In response to a request, from the user device, for a frame having a particular pixel resolution, the cache may copy the most recent available frame from the origin and make it available to the user device. In the example that the content delivery network comprises multiple tiers of caches, as shown in FIG. 4, the cache may copy the most recent available frame from upstream storage (e.g., the origin or an upstream cache) and make the frame available to a playback device or downstream storage (e.g., the user device or a downstream cache).

The cache may be configured to "pull" new frames from upstream storage and to delete older frames for as long as the cache has active playback requests from one or more user devices. For example, each time a new frame is requested or received at the buffer, the oldest frame stored in the buffer may be deleted. After a predetermined length of time where no frames have been requested from a particular buffer, the cache may be configured let the buffer expire and all stored frames be deleted. Each cache may be configured to serve as many user devices as its network bandwidth permits. Should the number of user devices or the number of requests for frames exceed its network bandwidth, another tier of cache may be introduced. While each tier of network cache necessarily introduces some latency, this latency is generally measured in milliseconds and not whole seconds. For example, as shown in FIG. 4, each tier of cache may result in about 50 milliseconds of latency in the content delivery system.

The user device 110 may be configured to request one or more frames from a linear proxy cache in the content delivery network and to open a network session to begin playback. The user device, upon creation of the network session, may be configured to download, decrypt (in the example that the frame is encrypted), and buffer one or more frames in the memory of the user device. Playback may begin by the user device once a single frame of video is buffered. As network conditions improve or deteriorate, the player may consult the manifest and request a higher or lower pixel resolution for subsequent frame requests. Receiving a given frame from the content delivery network and buffering the frame in the memory of the user device may result in about 100 milliseconds of latency in the content delivery system. Thus, an example content delivery system comprising a content delivery network with two tiers of caches, where each frame of a content asset is encoded separately and individually from the remaining frames of the content asset, may only result in about 243 milliseconds of latency in the content delivery system.

Figure 5:
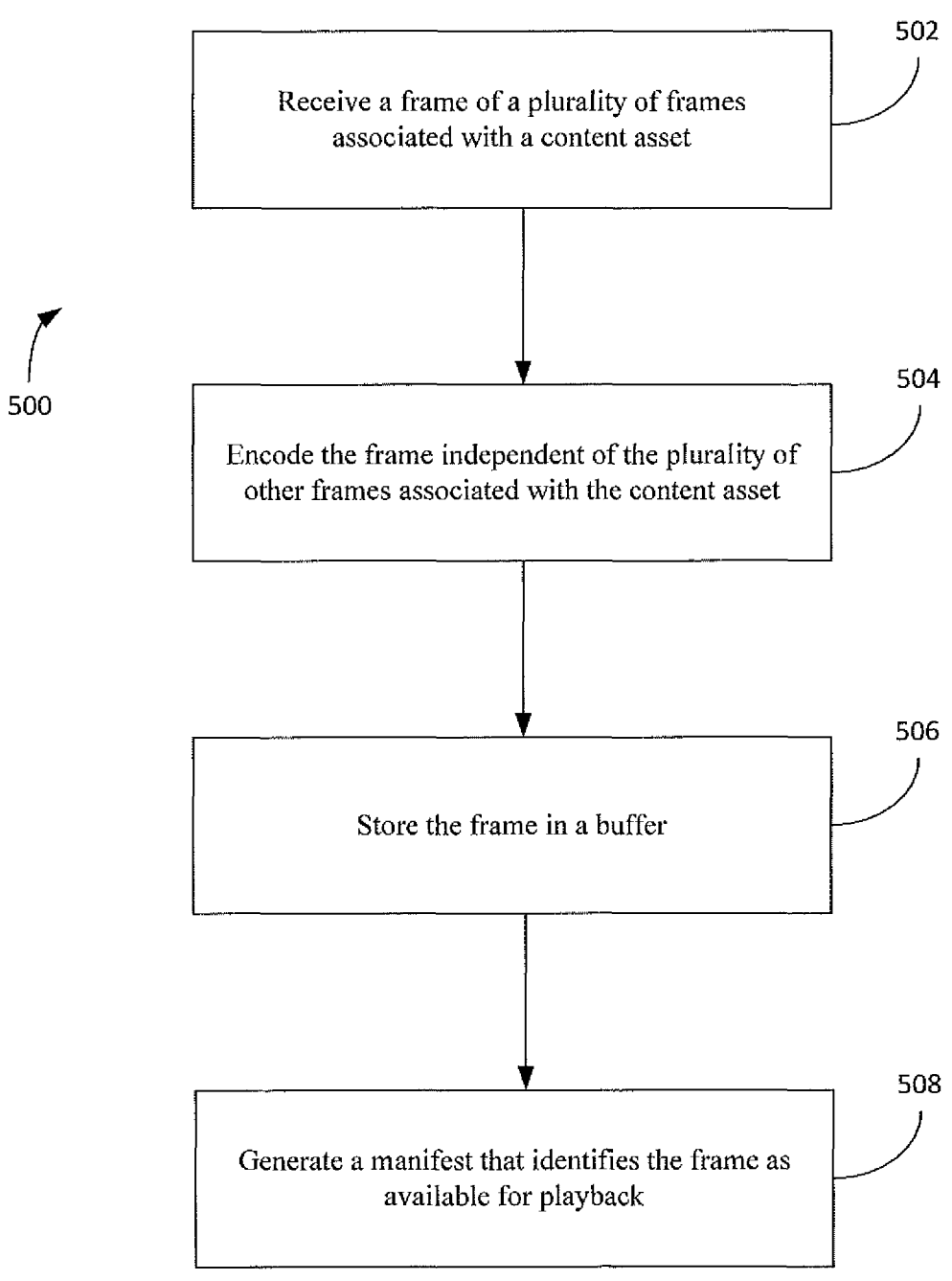
FIG. 5 shows a flow chart of an example method in accordance with an aspect of the disclosure.

FIG. 5 shows a flow chart of an example method 500 in accordance with an aspect of the disclosure. At step 502, a plurality of frames associated with a content asset may be received. The plurality of frames associated with the content asset may be received by the content distributor 102 shown in FIG. 1. The content asset may be, for example, a movie asset, a television asset, a live broadcast asset such as a sporting event, an audio asset such as music streaming, or a Video on Demand (VOD) asset. However, it is understood that the content asset may be any type of content asset having any length or duration and comprising any number of frames. In the example that the content asset is a two-hour movie having a playback frame rate of 30 frames per second, the content asset may be received as 216,000 individual frames.

At step 504, a given frame of the plurality of frames may be encoded. The frame may be encoded independent of and separately from the plurality of other frames of the content asset. The encoder 104 shown in FIG. 1 may receive an uncompressed content asset having a maximum playback resolution and, upon receipt of the uncompressed content asset, may be configured to separately encode each frame of the content asset. For example, the content asset may be received at the encoder 104 at a High Definition (HD), Ultra High Definition (UHD), 4K Ultra High Definition (4K) or High Dynamic Range (HDR) playback resolution. Encoding each frame of the received content asset may comprise encoding the frame to a plurality of pixel resolutions, such as 1280×720, 1024×578, 640×360 and 512×288. The encoder 104 may encode a given frame of the content asset using Joint Photographic Expert Group (JPEG) compression techniques, such as JPEG 2000 compression. However, it is understood that any type of compression techniques may be used.

Encoding a given frame of the plurality of frames of the content asset may comprise encrypting the frame. In one embodiment, each user device configured to receive content from the content distributor may be associated with a public key and a private key pair. While the public key may be known to the content distributor and may be used to encrypt the frame, the private key used to decrypt the received frame may be known only to the user device. Thus, encoding a given frame of the content asset may comprise encrypting the given frame at the content distributor using the public key associated with the user device. The frame may be encrypted individually and separately from the remaining frames of the content asset. The frame may then be transmitted over a secure channel. Upon receipt of the frame by the user device, the frame may be decrypted using only the private key associated with the user device. Thus, any user device that does not know the private key associated with that user device may not be able to decrypt the frame of the content asset.

At step 506, the given frame may be stored in a buffer. The buffer may be an area of memory used for the temporary storage of data, such as the frames of the content asset. In one embodiment, the buffers may be circular buffers. However, it is understood that any type of buffer may be used. Once stored in a given one of the buffers, the frame may be available for playback by one or more user devices. The buffer, in response to a request for playback of the frame by a user device, may send the frame to at least one cache of a plurality of caches in a content delivery network. Each buffer may be configured to deliver frames to as many user devices as its network bandwidth permits, and may be protected by a branching graph of linear caching proxies in the content delivery network. Each cache in the content delivery network may comprise a circular, timestamped frame buffer of each pixel resolution of video currently being viewed by a playback client, such as the user device 110 illustrated in FIG. 1. In response to a request, from the user device, for a frame having a particular pixel resolution, the cache may copy the most recent available frame from the origin and make it available to the user device.

The cache may be configured delete a given frame in response to a determination at the cache that playback of the frame has not been requested for a given amount of time. For example, if the cache determines that a given frame has not been requested for playback by a user device in thirty seconds, the cache may be configured to delete the frame. In another example, if the cache determines that a specific pixel resolution of a given frame has not been requested for playback by a user device in ten seconds, the cache may be configured only to delete that pixel resolution of the given frame.

At step 508, a manifest may be generated. The manifest may identify the given frame as available for playback by one or more user devices. The manifest may contain information describing various aspects of the associated content asset that may be useful for the device 110 to playback the content asset and/or for the content distributor 102 to store and retrieve the program. For example, the manifest may indicate each of the plurality of frames of the content asset, the number of frames included in the content asset, and/or the proper ordering of the frames necessary to effectuate a playback of the content asset. The manifest may comprise a network location (e.g., a hyper-text transfer protocol (HTTP) uniform resource locater (URL) link or other universal resource identifier (URI)) for each frame from which the frame may be downloaded, accessed, or retrieved. In one embodiment, generating a manifest may comprise timestamping the frame. For example, the content delivery system may be configured to attach to a given frame, as metadata, the time that the frame was encoded and/or made available for playback.

Figure 6:
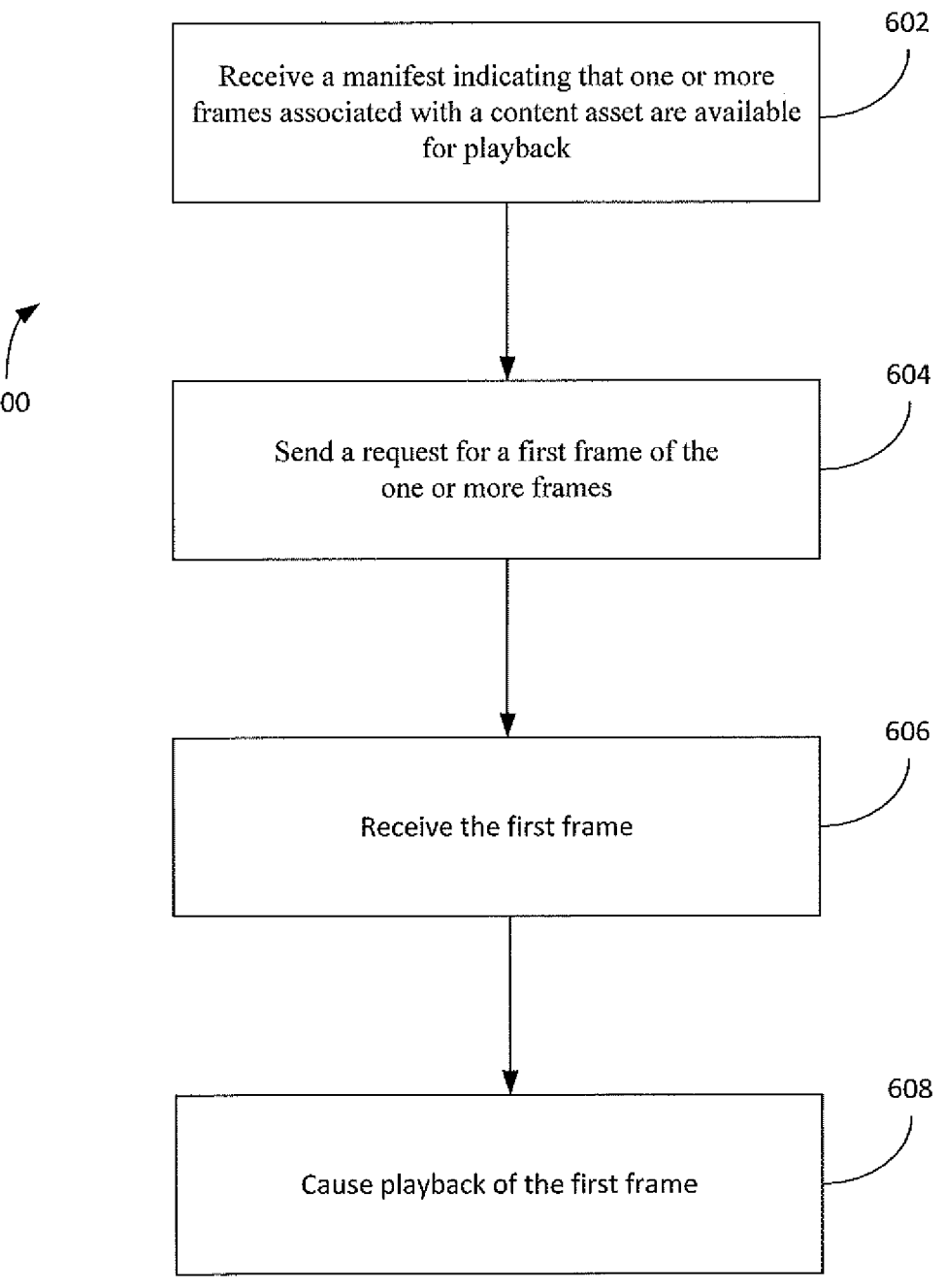
FIG. 6 shows a flow chart of an example method in accordance with an aspect of the disclosure.

FIG. 6 shows a flow chart of an example method 600 in accordance with an aspect of the disclosure. At step 602, a manifest may be received. The manifest may be received, for example, by the user device 102. The manifest may indicate that one or more frames associated with the content asset are available for playback by the user device. For example, the manifest may contain information describing various aspects of the associated content asset that may be useful for the device 110 to playback the content asset and/or for the content distributor 102 to store and retrieve the program. Each of the one or more frames of the content asset identified in the manifest may be encoded separately and individually from the other frames of the content asset. Each frame of the content asset may be encoded to a plurality of pixel resolutions. For example, the content asset may be received at the encoder 104 in High Definition (HD), Ultra High Definition (UHD), 4K Ultra High Definition (4K) or High Dynamic Range (HDR). Encoding each frame of the received content asset may comprise encoding the frame to a plurality of pixel resolutions, such as 1280×720, 640×360 and 512×288.

In one embodiment, each of the one or more frames may be encrypted, for example, using a public/private key pair. Each user device configured to receive content from the content distributor may be associated with a public key and a private key pair. While the public key may be known to the content distributor and may be used to encrypt the frame, the private key used to decrypt the received frame may be known only to the user device. Thus, encoding a given frame of the content asset may comprise encrypting the given frame at the content distributor using the public key associated with the user device. The frame may be encrypted individually and separately from the remaining frames of the content asset.

At step 604, a request for a given one of the one or more frames may be sent to a cache associated with a content delivery network. The content delivery network may comprise a plurality of caches, each cache comprising a circular, timestamped frame buffer of each pixel resolution of video currently being viewed by a user device. In one embodiment, sending a request for a given one of the one or more frames to the cache may comprise sending a request for a frame having a particular pixel resolution. In response to a request from the user device for a frame having a particular pixel resolution, the cache may copy the most recent available frame from the origin and make it available to the user device. In the example that the content delivery network comprises multiple tiers of caches, the cache may copy the most recent available frame from upstream storage (e.g., the origin or an upstream cache) and make it available to a playback device or downstream storage (e.g., the user device or a downstream cache). The cache may be configured to "pull" new frames from upstream storage and to delete older frames for as long as the cache has active playback requests from one or more user devices. For example, each time a new frame is requested or received at the buffer, the oldest frame stored in the buffer may be deleted. After a predetermined length of time where no frames have been requested from a particular buffer, the cache may be configured let the buffer expire and all stored frames be deleted. Each linear proxy cache may be configured to serve as many user devices as its network bandwidth permits.

At step 606, the frame may be received by the user device from the cache. In response to a request from the user device for a frame of a content asset having a particular pixel resolution, the cache may be configured to send, to the device, the frame of the particular pixel resolution. In one embodiment, the request may include an identifier associated with a given pixel resolution for a particular frame. In response to receipt of this request, the cache may send, to the user device, the corresponding pixel resolution of the frame associated with the received identifier. In the example that the one or more frames of the content asset are encrypted, the user device may be configured to decrypt the frame prior to playback of the frame. The frame may be decrypted using only the private key associated with the user device. Thus, any user device that does not know the private key associated with that user device may not be able to decrypt the frame of the content asset.

At step 608, the user device may cause playback of the given frame. The device may be configured to receive a frame having a particular pixel resolution from the cache associated with the content delivery network and to cause playback of that frame. After receipt or playback of the frame, the device may request, from the cache, a second frame of the content asset. In one embodiment, the cache, in response to receiving a request for the first frame, may determine to send, to the device, at least a second frame associated with the content asset without a specific request from the device for that frame. For example, the cache may determine to send the second frame to the device in response to a determination that the second frame is related to the first frame (e.g., the second frame follows the first frame in the content asset).

Figure 7:
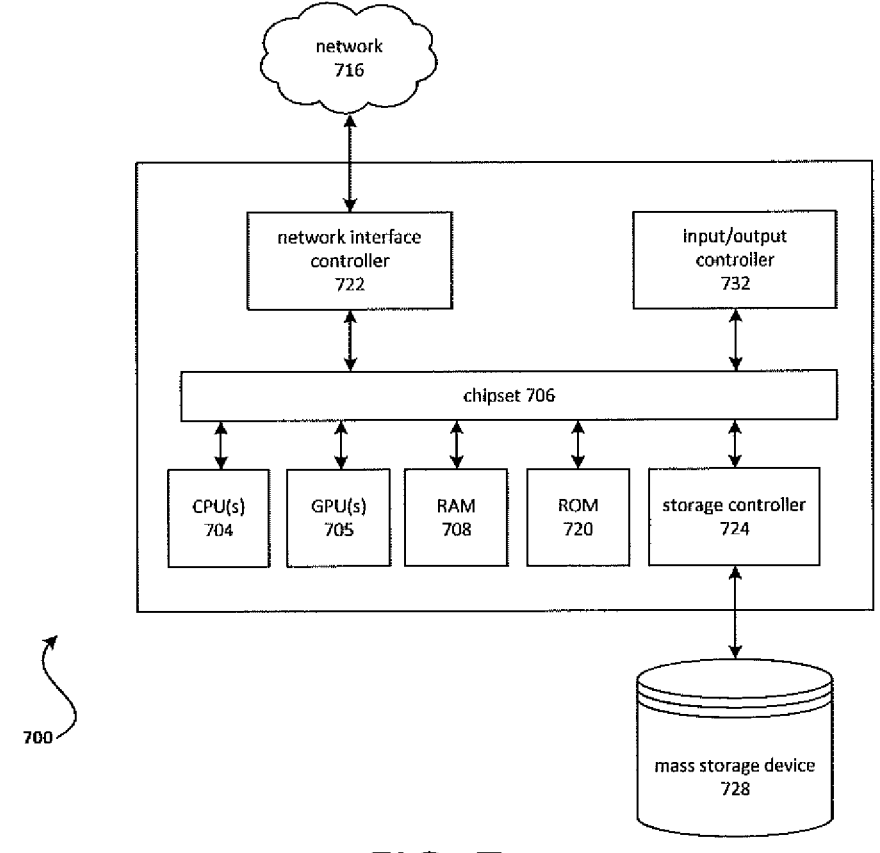
FIG. 7 shows a block diagram of an example computing device.

FIG. 7 depicts a computing device that may be used in various aspects, such as the servers, modules, and/or devices depicted in FIG. 1. With regard to the example architecture of FIG. 1, the encoder 104, origin server 106, and/or the user device 110 may each be implemented in an instance of a computing device 700 of FIG. 7. The computer architecture shown in FIG. 7 illustrates a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 3-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

receiving a plurality of frames of a content asset;

encoding each frame of the plurality of frames of the content asset independently and separately from each other frame of the plurality of frames of the content asset; and generating a manifest associated with the content asset, wherein the manifest identifies, for each of the individually and separately encoded frames of the content asset, a separate network location from which the encoded frame may be individually accessed by a user device.

2. The method of claim 1, wherein each of the encoded frames of the content asset is encrypted using a public and private key pair associated with a user device.

3. The method of claim 1, wherein each of the network locations is identified using a uniform resource locator (URL).

4. The method of claim 1, further comprising storing the encoded frames in a buffer.

5. The method of claim 4, wherein the buffer is a circular buffer.

6. The method of claim 4, wherein the buffer, based on a request for playback of one of the encoded frames, sends the encoded frame to at least one cache of a plurality of caches in a content delivery network.

7. The method of claim 1, wherein the encoding of each frame of the plurality of frames comprises encrypting and compressing each frame of the plurality of frames independently and separately from each other frame of the plurality of frames, and wherein compressing each frame of the plurality of frames comprises compressing each frame using Joint Photographic Expert Group (JPEG) compression.

8. The method of claim 1, wherein receiving the plurality of frames comprises receiving a plurality of uncompressed frames.

9. A method comprising:

receiving a plurality of frames of a content asset;

encoding a first frame of the plurality of frames of the content asset independently and separately from each other frame of the plurality of frames of the content asset;

encoding a second frame of the plurality of frames of the content asset independently and separately from the first frame and the other frames of the plurality of frames of the content asset, the first frame and the second frame being consecutive frames; and generating a manifest that separately identifies the encoded first and second frames as available for playback independently and separately from each other frame of the plurality of frames of the content asset.

10. The method of claim 9, wherein:

encoding the first frame comprises encrypting the first frame using a key; and encoding the second frame comprises encrypting the second frame using the key.

11. The method of claim 10, wherein the key is a public and private key pair.

12. The method of claim 9, further comprising storing the encoded first frame and the encoded second frame in a buffer, wherein the buffer, based on a request for playback of the first frame or the second frame, sends the encoded first frame or the encoded second frame to at least one cache of a plurality of caches in a content delivery network.

13. The method of claim 12, further comprising:

providing a timestamp for the encoded first frame; and providing a timestamp for the encoded second frame, wherein the at least one cache is configured to delete the encoded first frame or the encoded second frame based on a determination that playback of the encoded first frame or the encoded second frame has not been requested for a particular amount of time.

14. The method of claim 12, wherein the buffer is a circular buffer.

15. The method of claim 9, wherein:

encoding the first frame independently and separately from each other frame of the plurality of frames comprises compressing the first frame independently and separately from each other frame of the plurality of frames; and encoding the second frame independently and separately from each other frame of the plurality of frames comprises compressing the second frame independently and separately from each other frame of the plurality of frames.

16. The method of claim 9, wherein the manifest identifies:

a separate network location from which the first encoded frame may be individually accessed by a user device; and another separate network location from which the second encoded frame may be individually accessed by the user device.

17. A method comprising:

receiving a manifest indicating that each frame of a plurality of frames of a content asset are available for playback, each frame being identified in the manifest independently and separately from each other frame of the plurality of frames, each frame comprising video content that is encoded independently and separately from each other frame of the plurality of frames to a plurality of pixel resolutions, sending, to a cache associated with a content delivery network, a request for each frame at a particular pixel resolution of the plurality of pixel resolutions;

receiving, from the cache, each frame at the particular pixel resolution; and causing playback of each frame at the particular pixel resolution.

18. The method of claim 17, further comprising decrypting each frame prior to playback.

19. The method of claim 17, wherein sending the request for each frame at the particular pixel resolution comprises sending an identifier associated with the particular pixel resolution.

20. The method of claim 17, wherein each frame comprises video content that is compressed independently and separately from video content associated with each other frame of the plurality of frames.

21. The method of claim 17, wherein the manifest identifies, for each of the individually and separately encoded frames of the content asset, a separate network location from which the encoded frame may be individually accessed by a user device.

\* \* \* \* \*